(12) United States Patent
Henahan et al.

(10) Patent No.: US 9,115,648 B2
(45) Date of Patent: Aug. 25, 2015

(54) CORRECTED MEGAWATT BACKUP CURVE METHODOLOGY

(75) Inventors: James Henahan, Simpsonville, SC (US); Harold Lamar Jordan, Greenville, SC (US); David Ewens, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1471 days.

(21) Appl. No.: 12/421,795

(22) Filed: Apr. 10, 2009

(65) Prior Publication Data

US 2010/0262350 A1 Oct. 14, 2010

(51) Int. Cl.
*F02C 9/00* (2006.01)
*F02C 9/28* (2006.01)

(52) U.S. Cl.
CPC .............. *F02C 9/28* (2013.01); *F05D 2270/053* (2013.01); *F05D 2270/301* (2013.01); *F05D 2270/303* (2013.01)

(58) Field of Classification Search
CPC ...... F02C 9/28; F02C 9/24; F02D 2200/0414; F02D 2200/0802; F02D 2200/703; F01N 11/005; F01N 11/007
USPC ........................................................ 701/100
See application file for complete search history.

(56) References Cited

U.S. PATENT DOCUMENTS

| | | | |
|---|---|---|---|
| 4,245,462 A | 1/1981 | McCombs, Jr. | |
| 4,296,601 A * | 10/1981 | Martin | 60/224 |
| 4,326,376 A | 4/1982 | Stearns et al. | |
| 6,763,664 B2 | 7/2004 | Aoyama | |
| 7,020,595 B1 | 3/2006 | Adibhatla et al. | |
| 7,610,745 B2 | 11/2009 | Fujii et al. | |
| 7,681,401 B2 | 3/2010 | Ziminsky et al. | |
| 7,797,113 B2 * | 9/2010 | Yoshida et al. | 702/33 |

(Continued)

FOREIGN PATENT DOCUMENTS

| | | |
|---|---|---|
| CN | 101166935 A | 4/2008 |
| CN | 101230790 A | 7/2008 |

(Continued)

OTHER PUBLICATIONS

Unofficial English Translation of Japanese Office Action issued in connection with corresponding JP Application No. 2010089088 on Feb. 3, 2015.

(Continued)

*Primary Examiner* — John Q Nguyen
*Assistant Examiner* — Kyung Kim
(74) *Attorney, Agent, or Firm* — Cooper Legal Group, LLC (57) ABSTRACT

The subject application involves a method of controlling operation of a gas turbine. The method includes determining a first temperature associated with a portion of the gas turbine during operation of said gas turbine, and sensing an operational parameter of the gas turbine during operation of the gas turbine. An ambient pressure in an ambient environment of the gas turbine is also sensed, and the operational parameter corrected using the ambient pressure sensed in the ambient environment of the gas turbine to establish a corrected operational parameter. A threshold temperature is determined based at least in part on the corrected operational parameter, and a backup routine is initiated to limit operation of the gas turbine when the temperature associated with the gas turbine is greater than or equal to the threshold temperature.

20 Claims, 3 Drawing Sheets

(56) References Cited

U.S. PATENT DOCUMENTS

| | | |
|---|---|---|
| 7,837,429 B2 | 11/2010 | Zhang et al. |
| 2009/0055105 A1 | 2/2009 | Yoshida et al. |
| 2009/0301097 A1 | 12/2009 | Deuker et al. |

FOREIGN PATENT DOCUMENTS

| | | | |
|---|---|---|---|
| JP | 2001174366 A | 6/2001 | |
| JP | 2002054460 A | 2/2002 | |
| JP | 2003113721 A | 4/2003 | |
| JP | 2004308596 A | 11/2004 | |
| JP | 2007077867 A | 3/2007 | |
| JP | 2007107446 A | 4/2007 | |
| JP | 2008051099 A | 3/2008 | |
| JP | 2008088961 A | 4/2008 | |
| JP | 2009047092 A | 3/2009 | |

OTHER PUBLICATIONS

Unofficial English translation of JP Office Action dated Jan. 28, 2014, issued in connection with corresponding JP Application No. 2010-089088.

Unofficial English translation of Office Action issued in connection with corresponding CN Application No. 201010165172.6 on Sep. 27, 2013.

\* cited by examiner

CORRECTED MEGAWATT BACKUP CURVE METHODOLOGY

BACKGROUND OF THE INVENTION

1. Field of the Invention

This application relates generally to a method and apparatus for controlling operation of a gas turbine for electric power generation, and more specifically to a backup method and apparatus for overriding control of a gas turbine to reduce damage to the gas turbine when an operational irregularity occurs.

2. Description of Related Art

Conventional backup control curves have been generated for gas turbines to reduce operation of the gas turbines in the event that an operational parameter falls outside a range of allowable values. The reduced operation of the gas turbine is designed to lower the output of the gas turbine from its standard output under normal operating conditions to avoid damage to the gas turbine.

One such operational parameter, the exhaust temperature of the gas turbine, can be predicted based on the power output by the gas turbine. Thus, the power output by the gas turbine can be correlated to a predicted exhaust temperature. When the power output by the gas turbine exceeds an upper limit the exhaust temperature is determined to be above a satisfactory operational temperature above which the gas turbine becomes prone to being damaged or prone to inefficient operation. Under such conditions the controller initiates a backup control routine to reduce the output of the gas turbine to minimize the likelihood that the gas turbine will be damaged.

Figure 1:
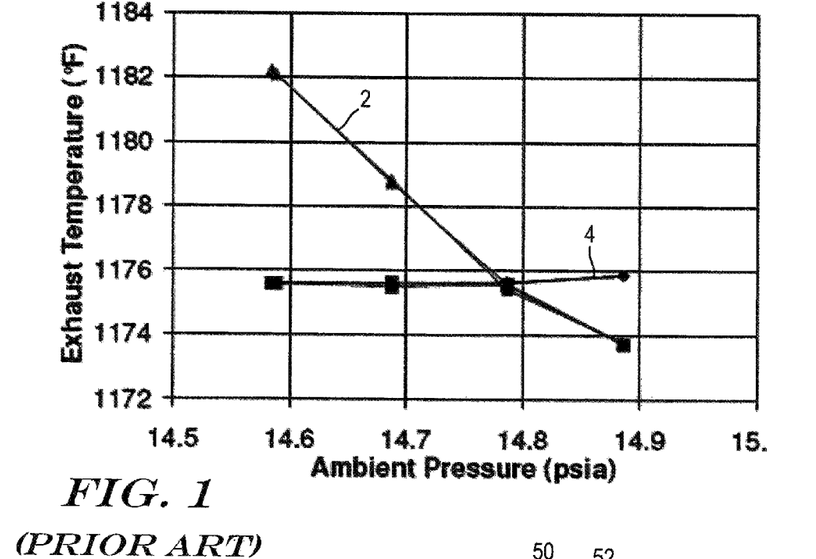
FIG. 1 is an example plot illustrating a pressure dependence of a conventional backup control curve for a gas turbine.

For example, FIG. 1 shows a conventional backup curve 2 and a control curve 4 presented on a grid of exhaust temperature of the gas turbine versus ambient pressure. The control curve 4 is generated for the gas turbine and programmed into a controller to establish a target exhaust temperature of the gas turbine under normal operating conditions to achieve a desired output. The conventional backup curve 2, on the other hand, is also generated for the gas turbine and programmed into the controller to establish an upper limit of the exhaust temperature instead of a target exhaust temperature. If the exhaust temperature is determined to reach or exceed this upper limit a backup control routine is executed by the controller to limit operation of the gas turbine and bring the exhaust temperature back down to a suitably-low temperature.

As can be seen in the example shown in FIG. 1, the conventional backup curve 2 exhibits a significant pressure dependence, while the control curve 4 remains relatively constant over the range of ambient pressures shown. As the pressure in the ambient environment of the gas turbine increases and exceeds a reference value of ambient pressure, the conventional backup curve 2 intersects and extends below the control curve 4 just below a pressure of 14.8 psia. At pressures greater than the 14.8 psia ambient pressure in FIG. 1 the exhaust temperature requested according to the conventional backup curve 2 is less than the target exhaust temperature requested according to the control curve 4. Thus, at elevated pressures the conventional backup curve 2 will call for lower exhaust temperatures than the control curve 4, meaning that gas turbine will provide a lower power output than afforded by the control curve 4 at these elevated pressures. In other words, the controller provided to the gas turbine will unnecessarily control operation of the gas turbine according to the conventional backup curve 2 to limit the output of the gas turbine under elevated pressures when operation of the gas turbine according to the control curve 4 is otherwise appropriate.

A method and apparatus for executing a backup control routine that accounts for changes in pressure that may occur in an ambient environment of a gas turbine would provide benefit over the known methods and systems.

BRIEF DESCRIPTION OF THE INVENTION

According to one aspect, the subject application involves a method of controlling operation of a gas turbine. The method includes determining a first temperature associated with a portion of the gas turbine during operation of said gas turbine, and sensing an operational parameter of the gas turbine during operation of the gas turbine. An ambient pressure in an ambient environment of the gas turbine is also sensed, and the operational parameter corrected using the ambient pressure sensed in the ambient environment of the gas turbine to establish a corrected operational parameter. A threshold temperature is determined based at least in part on the corrected operational parameter, and a backup routine is initiated to limit operation of the gas turbine when the temperature associated with the gas turbine is greater than or equal to the threshold temperature.

According to another aspect, the subject application involves a controller to be provided to a gas turbine for controlling operation of said gas turbine. The controller includes an input interface for receiving: a first signal indicative of a first temperature associated with a portion of the gas turbine during operation of said gas turbine, a second signal indicative of an operational parameter of the gas turbine during operation of the gas turbine, and a pressure signal indicating an ambient pressure in an ambient environment of the gas turbine. The controller also includes a computational component for: correcting the operational parameter using the ambient pressure in the ambient environment of the gas turbine to establish a corrected operational parameter, determining a threshold temperature based at least in part on the corrected operational parameter, and initiating a backup routine that limits operation of the gas turbine when the temperature associated with the gas turbine is greater than or equal to the threshold temperature. Further, the controller includes an output interface for transmitting a control signal in response to said initiating the backup routine to adjust a fuel flow controller for reducing at least one of a quantity and a delivery rate of fuel delivered to the gas turbine to a reduced level that is lower than a level at which the at least one of the quantity and the rate of fuel is delivered when the first temperature is lower than the threshold temperature.

According to another aspect, the subject application involves a gas turbine including backup protection to reduce occurrences of undesired high operating temperatures. The gas turbine includes a compressor for elevating a pressure of air entering a compressor inlet, a combustion region housing a fuel delivery device that injects fuel into the combustion region to be ignited, and a turbine disposed downwind of the combustion region to be rotated by the air. An output shaft is operatively coupled to the turbine for transmitting a rotational force from the turbine to a load. An array of sensors is provided for sensing at least one of: an operational parameter of the gas turbine, a first temperature associated with a portion of the gas turbine, and an ambient pressure in an ambient environment of the gas turbine. A controller is operatively connected to communicate with the array of sensors. The controller includes an input interface for receiving: (a) a first signal transmitted by the array of sensors to indicate a first temperature associated with a portion of the gas turbine during operation of said gas turbine, (b) a second signal transmitted by the array of sensors to indicate an operational parameter of the gas turbine during operation of the gas turbine, and (c) a pressure signal transmitted by the array of sensors indicating an ambient pressure in an ambient environment of the gas turbine. The controller also includes a computational component for: (a) correcting the operational parameter using the ambient pressure in the ambient environment of the gas turbine to establish a corrected operational parameter, (b) determining a threshold temperature based at least in part on the corrected operational parameter, and (c) initiating a backup routine that limits operation of the gas turbine when the temperature associated with the gas turbine is greater than or equal to the threshold temperature. An output interface is also provided to the controller for transmitting a control signal in response to said initiating the backup routine to adjust a fuel flow controller for reducing at least one of a quantity and a delivery rate of fuel delivered to the gas turbine to a reduced level that is lower than a level at which the at least one of the quantity and the rate of fuel is delivered when the first temperature is lower than the threshold temperature.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION OF THE INVENTION

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

The subject application relates to a gas turbine including backup protection to reduce adverse conditions to the gas turbine and inefficient operation of the gas turbine resulting from undesirable high operating temperatures. The subject application also relates to a method and controller for controlling a gas turbine with such backup protection.

Figure 2:
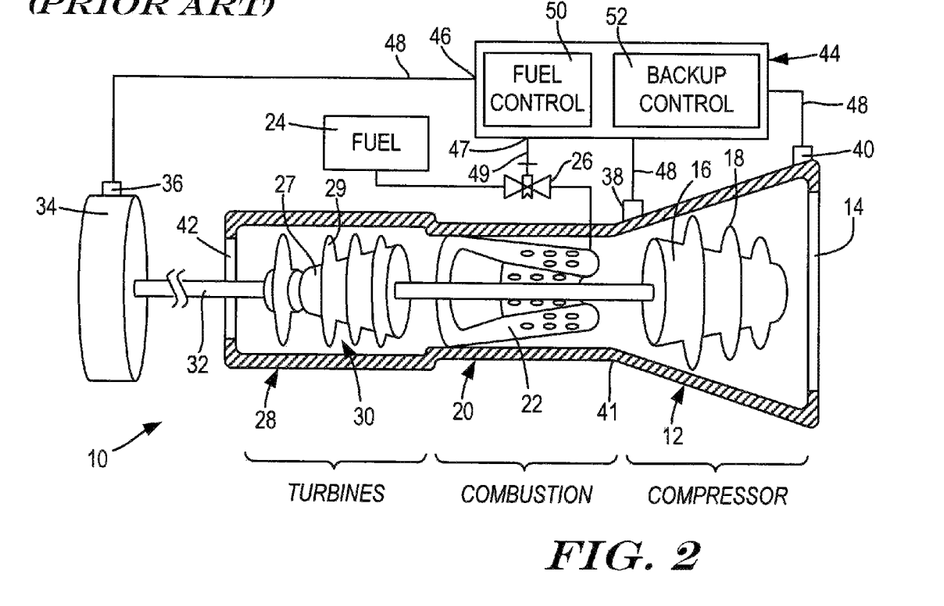
FIG. 2 is a schematic illustration of an embodiment of a gas turbine including a control apparatus according to an aspect of the present invention.

As shown in FIG. 2, the gas turbine 10 includes a compressor 12 for elevating a pressure of air entering a compressor inlet 14. As is known, the compressor 12 includes a hub 16 supporting an array of fan blades 18 that are rapidly rotated to force air into the gas turbine 10 at an elevated pressure that is greater than the ambient pressure within the ambient environment of the gas turbine 10. A combustion region 20 houses a fuel delivery device 22 that is perforated, commonly referred to as a "flame holder", into which fuel injectors inject fuel from a fuel supply 24 to be subsequently introduced into the interior of the combustion region 20 to be ignited. A fuel flow controller such as a valve 26 can be adjusted to control at least one of the quantity and the delivery rate at which fuel is introduced into the combustion region 20. Examples of suitable valves 26 can include solenoid valves, and any other type of electrically-actuated valve.

The gas turbine 10 also includes a turbine region 28 housing at least one turbine 30 disposed downwind of the combustion region 20 to be rotated by the air traveling through the gas turbine 10. An output shaft 32 is operatively coupled to the turbine 30 for transmitting a rotational force from the turbine 30 to a load, which is shown in FIG. 2 as a generator 34 of electric power. Similar to the compressor, the turbine 30 includes a hub 27 supporting an array of blades 29 on which the moving air is imparted to rotate the turbine 30, and accordingly, the output shaft 32.

The gas turbine 10 is also provided with an array of sensors 36, 38, 40 for sensing any desired operational parameter of the gas turbine 10 while the gas turbine 10 is operational. Examples of operational parameters include pressure, temperature, output power produced by the generator 34 and/or gas turbine 10, or any combination thereof. Other examples of sensed operational parameters include: a first temperature associated with a portion of the gas turbine 10, and an ambient pressure in an ambient environment of the gas turbine 10, and the like. Other embodiments can utilize one or more of the sensors 36, 38, 40 to sense values such as an air or fuel flow rate; an exhaust temperature of air being exhausted through an exhaust port 42 of the gas turbine 10; static and dynamic pressures at the inlet and outlet of the compressor 12, at the exhaust port 42, or elsewhere on the gas turbine 10; and the like. Although each of the sensors 36, 38, 40 can be independently selected to sense any respective quantity, the illustrative example explained in detail herein includes an output power sensor 36 for sensing the output power generated by the generator 34, a pressure sensor 38 for sensing an exhaust pressure adjacent an exit 41 of the compressor 12 provided to the gas turbine 10, and a pressure sensor 40 for sensing an ambient pressure in an ambient environment of the gas turbine 10 adjacent to the compressor inlet 14. The pressures sensed by the pressure sensors 38, 40 can be utilized to determine the compressor pressure ratio ("CPR") as explained below.

A controller 44 is operatively connected to communicate and with, and receive signals from the array of sensors 36, 38, 40 indicative of various operational parameters. The controller 44 includes an input interface 46 represented in FIG. 2 by the locations where the communication channels 48 meet the controller 44. For the illustrative example shown in FIG. 2 and described in detail below, the controller 44 receives a pressure signal transmitted by the sensor 38 indicating an exhaust pressure adjacent the exit 41 of the compressor 12, and another pressure signal transmitted by the sensor 40 to indicate an ambient pressure in the ambient environment of the gas turbine 10 adjacent the compressor inlet 14. The controller 44 also receives from the sensor 36 an output power generated by the generator 34 being driven by the gas turbine 10. Further, the controller also includes an output interface 47, represented by the location where the communication channel 49 meets the controller 44.

The controller 44 also includes computational components such as fuel controller 50 and backup controller 52. The computational components include processing hardware that can optionally execute computer-executable logic stored on a computer-readable medium to perform the various computational steps described below. The processing hardware of the computational components can be implemented with discrete logic circuits, or via a programmable logic controller.

Figure 3:
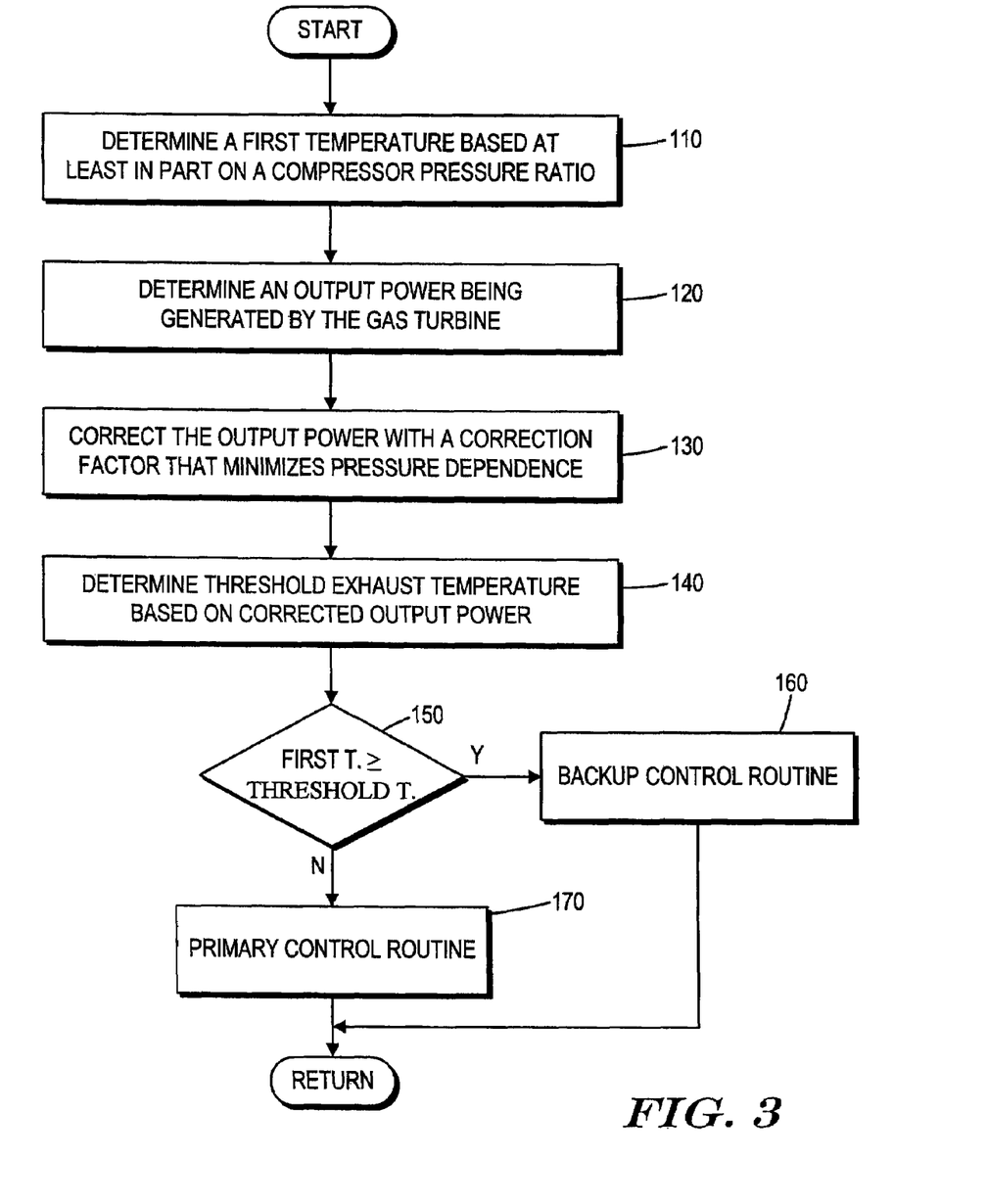
FIG. 3 is a flow diagram illustrating a method of controlling a gas turbine according to an aspect of the present invention.

Operation of the gas turbine and control apparatus can be understood with reference to the flow diagram of FIG. 3. In general, the control method described herein provides for a determination of an operating temperature associated with a portion of the gas turbine 10 via a primary method, and a determination of a threshold operating temperature via a backup method. The method that results in the lowest of the temperatures so determined is implemented as the active control method to minimize damage resulting from overheating of the gas turbine 10.

In other words, consider an example where the temperature being scrutinized is the exhaust temperature associated with the exhaust port 42 of the gas turbine 10. In this illustrative example, the primary method of determining the exhaust temperature is to calculate via an algorithm programmed into the controller 44 an estimated exhaust temperature as a function of the CPR, which itself is based on the signals transmitted by the pressure sensors 38, 40. The algorithm correlates the value of the CPR to a predicted value of the exhaust temperature. Also in this illustrative example, the backup method of determining the exhaust temperature is to predict the exhaust temperature, using another algorithm programmed into the controller 44, as a function of a corrected output power from the generator 34, which can be determined as described below. This algorithm, however, returns the highest allowable exhaust temperature, also referred to as the threshold temperature, for the output power sensed by sensor 36. Thus, the exhaust temperature determined according to the backup method is typically greater than the temperature determined according to the primary method. This builds in a degree of tolerance to the control method. But if a malfunction causes the temperature determined according to the primary method to rise to a level that meets or exceeds the temperature predicted according to the backup method, then the controller 44 can conclude that a malfunction has occurred and initiate a backup control routine that limits operation of the gas turbine 10 and minimizes the likelihood that thermal damage to the gas turbine 10 will result.

Of course any two methods of determining a first temperature associated with a portion of the gas turbine 10 and a threshold temperature as functions of different operational parameters to select a control routine as the active routine is within the scope of the present invention. Further, the temperature associated with any portion of the gas turbine 10, and not just the exhaust temperature can be determined. However, for the sake of clarity, a method of determining the first temperature based at least in part on the CPR and a backup method of determining the threshold temperature based on the output power from the generator 34 will be described with reference to FIG. 3.

The threshold temperature, according to one embodiment, can be a maximum temperature to which the internal components of the gas turbine 10 can be subjected without being damaged. According to alternate embodiments, the threshold temperature can be a maximum allowable exhaust temperature at an exhaust port 42 of the gas turbine 10 while the gas turbine 10 is operating at base load. Base load is calculated to optimize power output and the life of the gas-turbine components exposed to hot gases during operation of the gas turbine 10.

At step 110 in the present example, the CPR can be determined from the pressures sensed by sensors 38, 40 (FIG. 2) and used to estimate an exhaust temperature adjacent to the exhaust port 42 of the gas turbine 10 according to an algorithm programmed into the controller 44. The pressure sensed by pressure sensor 40 adjacent the compressor inlet 14 can also be used as the ambient pressure of the ambient environment of the gas turbine 10. According to alternate embodiments, however, another pressure sensor (not shown) remotely located from the gas turbine 10 or provided adjacent a different portion of the gas turbine 10 other than the compressor inlet 14 can optionally be used to sense the ambient pressure in the ambient environment of the gas turbine 10. Just as with the determination of the threshold exhaust temperature described below, the exhaust temperature based on the CPR at step 110 can be determined from referencing a lookup table stored in a memory of the controller 44, by calculating the exhaust temperature from a formula stored in the memory of the controller 44, by comparing the output power to experimental data stored in the memory of the controller 44, by extracting data from a curve stored in the memory of the controller 44, or in any other manner.

In addition to the temperature associated with the exhaust port 42 of the gas turbine 10 predicted based at least in part on the CPR, the controller 44 receives a signal indicative of another sensed operational parameter transmitted by sensor 36. In the present example, this signal is indicative of the output power being produced by the generator 34 driven by the gas turbine 10, and it allows the controller 44 to determine this output power being generated at step 120 in FIG. 3.

At step 130 the output power is to be corrected to minimize the effect of changes in the ambient pressure in the ambient environment of the gas turbine 10 on the determination of the threshold exhaust temperature. The output power can be normalized or otherwise corrected using the ambient pressure or any other environmental parameter in any suitable manner that minimizes the effect of the ambient pressure on the threshold exhaust temperature so determined. In the present example, however, the output power sensed by the sensor 36 (FIG. 2) is corrected by dividing the sensed output power by a correction factor according to the equation:

$$P_{CORR} = \frac{P}{\Delta}$$

wherein: $P_{CORR}$=the corrected output power

P=output power sensed by the sensor 36; and $\Delta$=correction factor for minimizing ambient pressure dependence As mentioned, the correction factor can be any normalizing value or other suitable value that can minimize the dependence of the threshold exhaust temperature on the ambient pressure in the ambient environment of the gas turbine 10. In the present example, however, the correction factor takes into account the ambient pressure according to the equation:

$$\Delta = \frac{\text{Ambient pressure } psia}{14.696 \ psia}$$

The correction factor in the present example is a dimensionless factor that normalizes the ambient pressure sensed adjacent to the compressor inlet 14 with a pressure that is about equal to atmospheric pressure at sea level (14.696 psia). Using the corrected output power, the controller 44 can determine the threshold exhaust temperature at step 140. Again, the threshold exhaust temperature can be determined using the corrected output power with reference to a lookup table stored in a memory of the controller 44, by calculating the exhaust temperature from a formula stored in the memory of the controller 44, by comparing the output power to experimental data stored in the memory of the controller 44, by extracting data from a curve stored in the memory of the controller 44, or in any other manner.

At step 150 in FIG. 3, the exhaust temperature determined based at least in part on the CPR is compared to the threshold exhaust temperature determined based at least in part on the corrected output power. The control routine that is active is selected IF, at step 150, the exhaust temperature based on the CPR is greater than or equal to the threshold temperature, THEN the method continues to step 160, at which the backup control routine is initiated. Otherwise, a standard control routine is initiated, or maintained if it is already active at step 170.

Referring again to FIG. 2, in operation a user can input a control command to instruct the gas turbine 10 to operate in a desired manner. For example, the user can specify a desired power output, a desired speed of the gas turbine, or any other such control command. Based on this user input, the standard control routine corresponding to the user command that was input can be initiated by the controller 44 to cause the gas turbine to operate as desired. If the exhaust temperature becomes greater than or equal to the threshold exhaust temperature, the controller 44 can override the standard control routine and initiate the backup control routine to limit operation of the gas turbine 10. Initiating the backup control routine limits operation of the gas turbine 10 by controlling the supply of the fuel to the combustion region 20. For example, the controller 44 can transmit a signal that adjusts the valve 26 to reduce a quantity of fuel supplied to the combustion region 20 to a lower quantity than the quantity that is supplied while the standard control routine is active. According to an alternate embodiment, the rate at which the fuel is supplied to the combustion region 20 is reduced to a slower rate that the rate at which the fuel is supplied according to the standard control routine.

Correcting the output power or other operational parameter used to determine the threshold exhaust temperature can optionally provide a substantially constant threshold temperature over a substantially complete range of ambient pressures that are likely to be experienced in the ambient environment in which the gas turbine 10 is to be installed. The range of ambient pressures extends from about a lowest ambient pressure that can be expected in the ambient environment in which the gas turbine 10 is to be used to about a highest ambient pressure that can be expected in the ambient environment in which the gas turbine 10 is to be used, as illustrated in FIG. 4.

Figure 4:
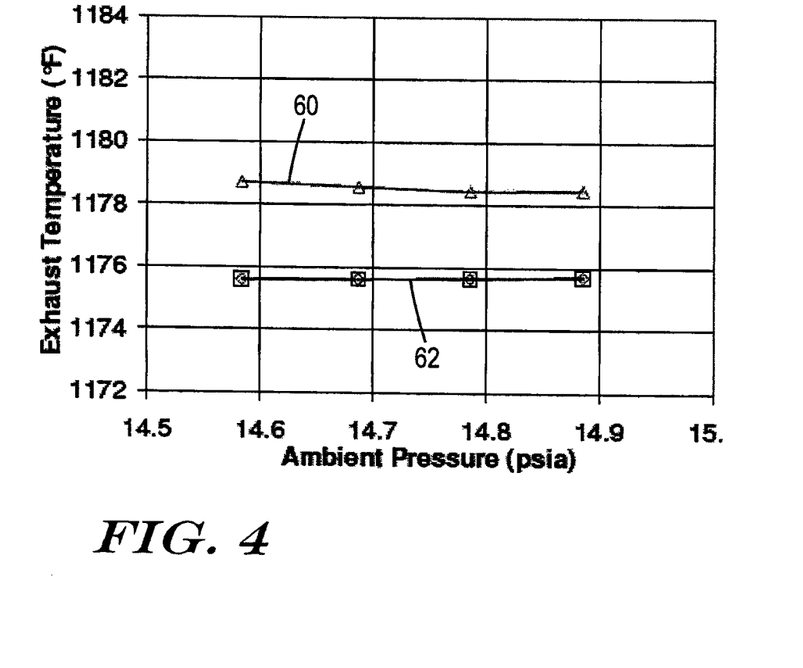
FIG. 4 is an example plot illustrating a relationship between a corrected backup control curve and a control curve for a gas turbine according to an aspect of the present invention.

FIG. 4 is an example of a plot illustrating a relationship between a corrected backup control curve and a control curve for a gas turbine according to an aspect of the present invention. Recall that the conventional backup control curve 2 in FIG. 1 varied significantly, primarily as a function of the ambient temperature of the gas turbine 10. However, FIG. 4 shows a backup control curve 60 corresponding to the threshold exhaust temperature determined according to the backup routine, which is based at least in part on the corrected output power, as a function of ambient pressure. As can be seen, the threshold exhaust temperature is substantially constant, at temperatures between 1178° F. and 1179° F. for the range of ambient pressures likely to be experienced in this particular application. The backup control curve 60 in FIG. 4 does not vary primarily as a function of ambient pressure, unlike the conventional control curve 2 in FIG. 1. The substantially complete range of temperatures in FIG. 4 ranges from slightly less than 14.6 psia to slightly less than 14.9 psia.

Likewise, the control curve 62 corresponding to the exhaust temperature determined according to the standard control routine is also substantially constant. That exhaust temperature varies only slightly based primarily on ambient temperature, and is maintained between 1175° F. and 1176° F.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of controlling operation of a gas turbine, the method including:
    determining a first temperature associated with a portion of the gas turbine during operation of said gas turbine;
    sensing an operational parameter of the gas turbine during operation of the gas turbine;
    sensing an ambient pressure in an ambient environment of the gas turbine;
    correcting the operational parameter using the ambient pressure sensed in the ambient environment of the gas turbine to establish a corrected operational parameter;
    determining a threshold temperature based at least in part on the corrected operational parameter; and
    initiating a backup routine that limits operation of the gas turbine when the temperature associated with the gas turbine is greater than or equal to the threshold temperature.

2. The method of claim 1, wherein the operational parameter is an output power being produced by a generator driven by the gas turbine, and the corrected operational parameter is a corrected output power that is corrected based at least in part on the ambient pressure in the ambient environment of the gas turbine to reduce variations of the threshold temperature due to changes in the ambient pressure over a range of ambient pressures.

3. The method of claim 2, wherein the range of ambient pressures is a substantially complete range of pressures expected to be experienced in the ambient environment in which the gas turbine is to be used.

4. The method of claim 2, wherein the corrected output power is determined by dividing an uncorrected output power by a correction factor, said correction factor including the ambient pressure sensed adjacent to an inlet of a compressor provided to the gas turbine divided by a value that is approximately equal to atmospheric pressure at sea level.

5. The gas turbine of claim 4, wherein the correction factor normalizes the ambient pressure sensed adjacent to the compressor inlet with a pressure that is approximately equal to atmospheric pressure at sea level.

6. The method of claim 1, wherein the threshold temperature is a maximum allowable exhaust temperature at an exhaust port of the gas turbine while the gas turbine is operating at base load.

7. The method of claim 6, wherein the first temperature associated with the portion of the gas turbine is an exhaust temperature of the gas turbine predicted based at least in part on a compressor pressure ratio.

8. The method of claim 1 further including operating the gas turbine according to a standard control routine in response to a control command input by a user when the temperature associated with the portion of the gas turbine is less than the threshold temperature, wherein
said limiting operation of the gas turbine overrides said operating the gas turbine according to the standard control routine when the temperature associated with the portion of the gas turbine is greater than or equal to the threshold temperature.

9. The method of claim 1, wherein the threshold temperature determined using the corrected value of the operational parameter is substantially constant over a range of ambient pressures.

10. The method of claim 9, wherein the range of ambient pressures extends from about a lowest ambient pressure that can be expected in the ambient environment in which the gas turbine is to be used to about a highest ambient pressure that can be expected in the ambient environment in which the gas turbine is to be used.

11. The method of claim 1, wherein the corrected operational parameter is a corrected output power produced by a generator driven by the gas turbine that is corrected based at least in part on the ambient pressure in the ambient environment of the gas turbine to minimize variations of the threshold temperature due to changes in the ambient pressure over a range of ambient pressures.

12. The method of claim 1, wherein the first temperature associated with the portion of the gas turbine is sensed by a temperature sensor adjacent to an exhaust port of the gas turbine.

13. A controller to be provided to a gas turbine for controlling operation of said gas turbine, the controller including:
an input interface for receiving:
a first signal indicative of a first temperature associated with a portion of the gas turbine during operation of said gas turbine,
a second signal indicative of an operational parameter of the gas turbine during operation of the gas turbine, and
a pressure signal indicating an ambient pressure in an ambient environment of the gas turbine;
a computational component for:
correcting the operational parameter using the ambient pressure in the ambient environment of the gas turbine to establish a corrected operational parameter,
determining a threshold temperature based at least in part on the corrected operational parameter, and
initiating a backup routine that limits operation of the gas turbine when the temperature associated with the gas turbine is greater than or equal to the threshold temperature; and
an output interface for transmitting a control signal in response to said initiating the backup routine to adjust a fuel flow controller for reducing at least one of a quantity and a delivery rate of fuel delivered to the gas turbine to a reduced level that is lower than a level at which the at least one of the quantity and the rate of fuel is delivered when the first temperature is lower than the threshold temperature.

14. The controller of claim 13, wherein the operational parameter is an output power being produced by a generator driven by the gas turbine, and the corrected operational parameter is a corrected output power that is corrected based at least in part on the ambient pressure in the ambient environment of the gas turbine to reduce variations of the threshold temperature due to changes in the ambient pressure over a range of ambient pressures.

15. The controller of claim 13, wherein the range of ambient pressures is a substantially complete range of pressures expected to be experienced in the ambient environment in which the gas turbine is to be used.

16. The controller of claim 13, wherein the computational component determines the corrected output power by dividing an uncorrected output power by a correction factor, said correction factor including the ambient pressure sensed adjacent to an inlet of a compressor provided to the gas turbine divided by a value that is approximately equal to atmospheric pressure at sea level.

17. The controller of claim 13, wherein the first temperature is an exhaust temperature of the gas turbine predicted based at least in part on a compressor pressure ratio.

18. The controller of claim 13, wherein the threshold temperature determined using the corrected value of the operational parameter is substantially constant over a range of ambient pressures, wherein the range of ambient pressures extends from about a lowest ambient pressure that can be expected in the ambient environment in which the gas turbine is to be used to about a highest ambient pressure that can be expected in the ambient environment in which the gas turbine is to be used.

19. A gas turbine including backup protection to reduce occurrences of undesired high operating temperatures, the gas turbine including:
a compressor for elevating a pressure of air entering a compressor inlet;
a combustion region housing a fuel delivery device that injects fuel into the combustion region to be ignited;
a turbine disposed downwind of the combustion region to be rotated by the air;
an output shaft operatively coupled to the turbine for transmitting a rotational force from the turbine to a load;
an array of sensors for sensing at least one of: an operational parameter of the gas turbine, a first temperature associated with a portion of the gas turbine, and an ambient pressure in an ambient environment of the gas turbine; and
a controller operatively connected to communicate with the array of sensors, said controller including:
an input interface for receiving:
a first signal transmitted by the array of sensors to indicate a first temperature associated with a portion of the gas turbine during operation of said gas turbine,
a second signal transmitted by the array of sensors to indicate an operational parameter of the gas turbine during operation of the gas turbine, and
a pressure signal transmitted by the array of sensors indicating an ambient pressure in an ambient environment of the gas turbine;
a computational component for:

correcting the operational parameter using the ambient pressure in the ambient environment of the gas turbine to establish a corrected operational parameter, determining a threshold temperature based at least in part on the corrected operational parameter, and initiating a backup routine that limits operation of the gas turbine when the temperature associated with the gas turbine is greater than or equal to the threshold temperature; and an output interface for transmitting a control signal in response to said initiating the backup routine to adjust a fuel flow controller for reducing at least one of a quantity and a delivery rate of fuel delivered to the gas turbine to a reduced level that is lower than a level at which the at least one of the quantity and the rate of fuel is delivered when the first temperature is lower than the threshold temperature.

20. The gas turbine of claim 19, wherein the load includes a generator of electric power.

\* \* \* \* \*